(No Model.)
N. BIRTZ.
DEVICE FOR PREVENTING HORSES FROM RUNNING AWAY.
No. 512,149. Patented Jan. 2, 1894.
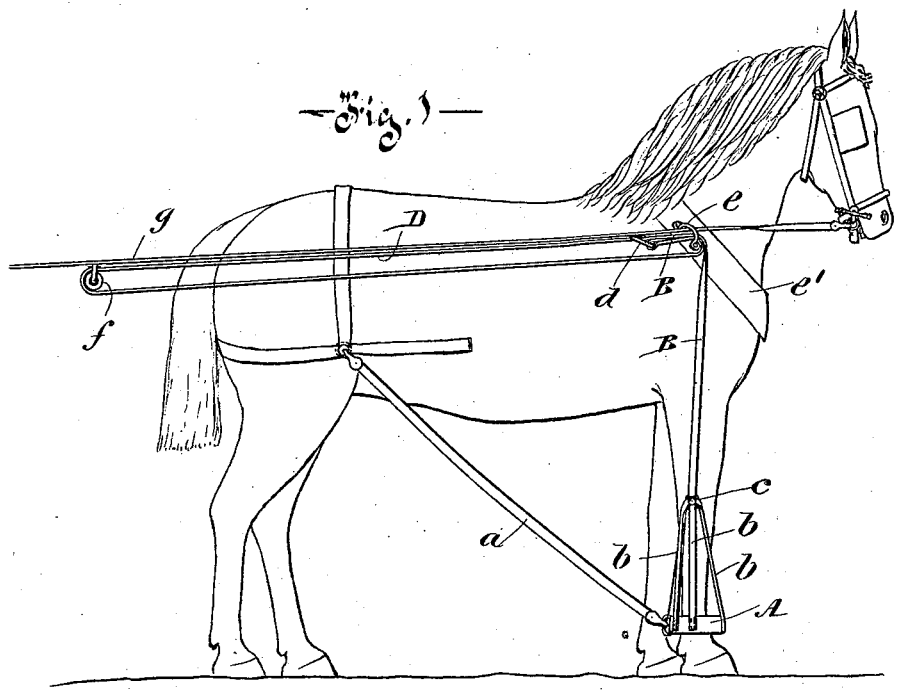
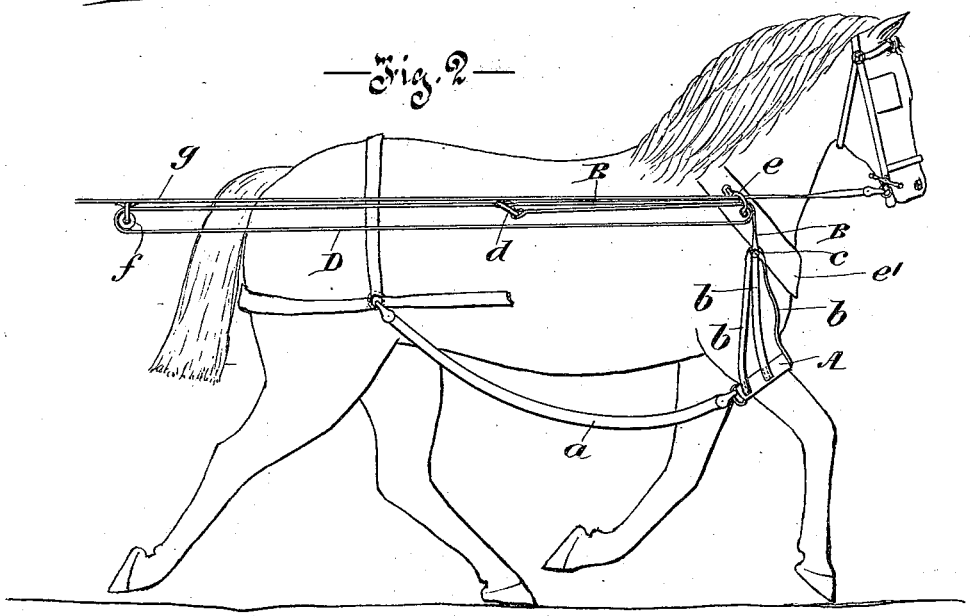

UNITED STATES PATENT OFFICE.

NORBERT BIRTZ, OF MONTREAL, CANADA, ASSIGNOR OF ONE-HALF TO WILLIAM HEWSON, OF SAME PLACE.

DEVICE FOR PREVENTING HORSES FROM RUNNING AWAY.

SPECIFICATION forming part of Letters Patent No. 512,149, dated January 2, 1894.

Application filed July 1, 1893. Serial No. 479,414. (No model.)

*To all whom it may concern:*

Be it known that I, NORBERT BIRTZ, of the city of Montreal, in the district of Montreal and Province of Quebec, Canada, have invented certain new and useful Improvements in Devices for Preventing Horses from Running Away; and I do hereby declare that the following is a full, clear, and exact description of the same.

My invention relates to devices of the movable hopple type under control of the driver.

The object of the invention is to overcome difficulties met with in the attempt to lower the present form of device upon the horse's legs and by experiment it has been established that interfering with one of the horse's legs is just as effective as if two were held and by using a single independently movable hopple upon one leg there is no possibility of the movement of the horse's legs preventing the hopple being lowered, when desired, as is the case when a pair of hopples connected together, or a common loop for both legs with sliding weight, are used. My invention, on the contrary, provides a single independently movable retaining hopple encircling one leg only of the horse and which, in its downward movement, can not be interfered with by the other leg of the animal; the invention also comprising means for facilitating the lowering of the hopple. For full comprehension however of the invention, reference must be had to the annexed drawings forming a part of this specification in which like symbols indicate corresponding parts and wherein—

Figure 1 is a side view of a horse standing still and the hopple lowered to encircle the fetlock of the fore leg, and Fig. 2 a side view of a horse trotting and showing the hopple raised to free the leg.

My invention as before stated consists essentially of a hopple A, or like retainer, with retaining strap $a$, preferably extending from the breeching portion of the horse's harness, and movable up and down the horse's leg, and the preferable means for elevating and lowering same consists of a strap B suitably connected at one end by branch strips $b$ from a common eye $c$ to the hopple A and having its opposite end adjustably attached, as by a buckle $d$, to an endless strap D which passes through an eye $e$ on the horse's collar $e'$ and around a pulley or roller $f$ suspended from the driving rein $g$. In its normal position the hopple is elevated, this being done by pulling on the upper portion of the endless strap in the direction of the arrow while to lower the hopple the lower portion of the same strap is pulled in the like direction, frictional contact being sufficient to hold the parts in place.

It may not be necessary in all cases to lower the hopple more than to the horse's knee joint and this can be done quite as readily and the hopple held at that point.

From Fig. 2 it will be seen that in its normal position the hopple does not interfere in the slightest with the horse's action.

I do not wish to be confined to the use of the endless strap as the only means of controlling the movable hopple since a single strap or line would be quite efficacious if taken through the usual free apertures to be found in connection with harness, and in fact the device can be used with equal advantage in riding, as the movable hopple can be applied to the hind leg of the horse and the retaining strap attached to the saddle or if the fore leg is preferred a breeching and back strap may be provided in addition to the usual saddle gear in order to afford a point of attachment for the hopple retaining strap.

What I claim is as follows:

1. A device for preventing horses from running away consisting of a single encircling hopple in the form of an anklet of a permanently set form independently movable up and down one of the horse's legs; a single lateral retaining strap connection with one end secured to such hopple and the other end to the breeching portion of the horse's harness, a suspending strap with radiating branch strips between it and said hopple, and a connection extending from said strap to within handy reach of the driver for controlling such hopple.

2. A device for preventing horses from running away consisting of a single encircling hopple in the form of an anklet of a permanently set form independently movable up and down one of the horse's legs; a single lateral retaining strap connection with one end secured to such hopple and the other end to the breeching portion of the horse's harness; a suspending strap and radiating branch strips between it and said hopple, and a reciprocal band or line attachment, to which the upper end of said suspending strap is connected, and extending from such strap to within handy reach of the driver for controlling such hopple.

3. A device for preventing horses from running away consisting of a single encircling hopple in the form of an anklet of a permanently set form, a lateral retaining strap connection between such hopple and a fixed part of the horse's harness, an endless reciprocal band having sliding connection with carrying part of the horse's harness, and a suspending strap connected respectively to said reciprocal band and hopple, as set forth.

4. In a device for preventing horses from running away, the combination with the single encircling hopple A, free to be moved up and down the horse's leg and the single retaining strap $a$, of the endless strap D and points of attachment as pulley $f$ and eye $e$ allowing sliding connection with parts of the horse's harness and strap B suitably connected to the hopple and to the strap D, as set forth.

Montreal, 26th day of June, 1893.

NORBERT BIRTZ.

In presence of—
FRED. J. SEARS,
WILL P. McFEAT.